United States Patent
Gibson et al.

(10) Patent No.: US 9,824,472 B2
(45) Date of Patent: *Nov. 21, 2017

(54) DETERMINING ALTERNATIVE VISUALIZATIONS FOR DATA BASED ON AN INITIAL DATA VISUALIZATION

(71) Applicant: International Business Machines Corporation, Armonk, NY (US)

(72) Inventors: Stephen D. Gibson, Ontario (CA); Daniel J. Rope, Reston, VA (US); Graham J. Wills, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/224,565

(22) Filed: Mar. 25, 2014

(65) Prior Publication Data

US 2014/0198105 A1   Jul. 17, 2014

Related U.S. Application Data

(63) Continuation of application No. 13/610,198, filed on Sep. 11, 2012.

(51) Int. Cl.
G06T 11/20   (2006.01)
G06F 17/30   (2006.01)

(52) U.S. Cl.
CPC ...... *G06T 11/206* (2013.01); *G06F 17/30554* (2013.01); *G06F 17/30991* (2013.01)

(58) Field of Classification Search
None
See application file for complete search history.

(56) References Cited

U.S. PATENT DOCUMENTS 5,581,677 A    12/1996  Myers et al.
6,014,661 A *  1/2000   Ahlberg ............ G06F 17/30572
7,002,580 B1   2/2006   Aggala et al.
(Continued)

FOREIGN PATENT DOCUMENTS

CN   102483693 A    5/2012
JP   2004-259175 A  9/2004
(Continued)

OTHER PUBLICATIONS

Cutler et al., "Random Forests for Classification in Ecology", Nov. 2007, Ecological Society of America, vol. 88, Issue 11, http://www.esajournals.org/doi/abs/10.1890/07-0539.1.

(Continued)

*Primary Examiner* — Jacinta M Crawford
(74) *Attorney, Agent, or Firm* — Erik K. Johnson; Edell, Shapiro & Finnan, LLC

(57) ABSTRACT

According to one embodiment of the present invention, a computer-implemented method generates an alternative visualization of a data set based on a specification of a selected first visualization of the data set and parameters comprising information about a data visualization goal and statistical relations between two or more variables in the data set. Embodiments of the present invention further include a system and computer program product for generating an alternative visualization in substantially the same manners described above.

10 Claims, 8 Drawing Sheets

(56) References Cited

U.S. PATENT DOCUMENTS

| | | | |
|---|---|---|---|
| 7,714,862 | B1 | 5/2010 | Dwyer et al. |
| 8,024,666 | B2* | 9/2011 | Thompson ............. G06Q 10/00 345/440 |
| 9,299,173 | B2 | 3/2016 | Rope |
| 2003/0071814 | A1 | 4/2003 | Jou et al. |
| 2006/0070013 | A1 | 3/2006 | Vignet |
| 2006/0150122 | A1 | 7/2006 | Hintermeister et al. |
| 2007/0168154 | A1 | 7/2007 | Ericson |
| 2007/0208992 | A1 | 9/2007 | Koren |
| 2008/0005677 | A1 | 1/2008 | Thompson |
| 2008/0082908 | A1 | 4/2008 | MacGregor |
| 2009/0006241 | A1 | 1/2009 | Zhao et al. |
| 2009/0013271 | A1 | 1/2009 | Helfman et al. |
| 2009/0021517 | A1 | 1/2009 | Foslien |
| 2009/0287673 | A1 | 11/2009 | Chronister et al. |
| 2009/0300544 | A1 | 12/2009 | Psenka et al. |
| 2010/0049686 | A1 | 2/2010 | Gotz |
| 2010/0169137 | A1 | 7/2010 | Jastrebski et al. |
| 2010/0175006 | A1 | 7/2010 | Li |
| 2010/0191678 | A1* | 7/2010 | Steed ................... G06T 11/206 706/11 |
| 2010/0262949 | A1 | 10/2010 | Jacobsen et al. |
| 2011/0004483 | A1 | 1/2011 | Ting et al. |
| 2011/0148914 | A1 | 6/2011 | Kim |
| 2012/0078522 | A1 | 3/2012 | Avinash et al. |
| 2012/0313947 | A1* | 12/2012 | Rope ................... G06T 11/206 345/440 |
| 2012/0313949 | A1 | 12/2012 | Rope et al. |
| 2014/0071138 | A1 | 3/2014 | Gibson et al. |

FOREIGN PATENT DOCUMENTS

| | | |
|---|---|---|
| JP | 2009-508210 A | 2/2009 |
| JP | 2010-225053 A | 10/2010 |
| JP | 2011-113564 A | 6/2011 |

OTHER PUBLICATIONS

Perer et al., "Balancing systematic and flexible exploration of social networks". Visualization and Computer Graphics, IEEE Transactions on 12.5 (2006); 693-700.

Marineau, "Visual Data Mining: the case of VITAMIN System and other software.", 2004, Revue MODULAD 100.31, http://modulad.fr/archives/numero-31/morineau-31/morineau-31.pdf.

Tableau Software, "Tableau Show Me," kb.tableausoftware.com/articles/knowledgebase/automatic-show-me (viewed Mar. 1, 2012), 4 pages.

Jock Mackinlay, Pat Hanrahan, Chris Stolte, "Show Me: Automatic Presentation for Visual Analysis," IEEE Transactions on Visualization and Computer Graphics, vol. 13, No. 6, pp. 1137-1144, Nov.-Dec. 2007.

Martin Voight, Stefan Pietschmann, Lars Grammel, and Klaus Meissner, "Context-aware Recommendation of Visualization Components," eKNOW 2012: The Fourth International Conference on Information, Process, and Knowledge Management, IARIA 2012, ISBM: 978-1-61208-181-6, pp. 101-109.

Houssem Jerbi, Franck Ravat, Olivier Teste, and Gilles Zurfluh, "Applying Recommendation Technology in OLAP Systems," J. Fllipe and J. Cordiero (Eds.): ICEIS 2009, LNBIP 24, pp. 220-233, 2009.

David Gotz and Zhen Wen, "Behavior-Driven Visualization Recommendation," IUI'09, Feb. 8-11, 2009, Sanibel Island, Florida, USA. ACM 978-1-60558-331-0109102, pp. 315-324.

Osci, "Case study: Practical steps for improving visualization," 2009, http://www.improving-visualisation.org/case-studies/id=7 (viewed Mar. 12, 2012), 11 pages.

Juice Analytics, Inc., Juice Labs-Chart Chooser, http://labs.juiceanalytics.com/chartchooser.html (viewed Mar. 1, 2012), 2 pages.

Qu, Huamin, et al. "Visual analysis of the air pollution problem in Hong Kong." IEEE Transactions on visualization and computer Graphics 13.6 (2007), 8 pages.

S. G. Eick, "Visual discovery and analysis," in IEEE Transactions on Visualization and Computer Graphics, vol. 6, No. 1, Jan.-Mar. 2000, pp. 44-58.

Reference 1: Akiko Kitami, "Improve graph presentation by modification after graph preparation while freely adding, deleting and sorting data", Nikkei PC21, Japan, Nikkei Business Publications, Inc., Jul. 24, 2012, vol. 17, No. 14, pp. 104-109.

Japanese Office Action dated Aug. 22, 2017, English translation of a paragraph mentioning Reference 1 which indicates the degree of relevance, 1 page.

\* cited by examiner

DISCOVERY STAGE

DETERMINING ALTERNATIVE VISUALIZATIONS FOR DATA BASED ON AN INITIAL DATA VISUALIZATION

CROSS-REFERENCE TO RELATED APPLICATIONS

This application is a continuation of U.S. patent application Ser. No. 13/610,198, entitled "DETERMINING ALTERNATIVE VISUALIZATIONS FOR DATA BASED ON AN INITIAL DATA VISUALIZATION" and filed Sep. 11, 2012, the disclosure of which is incorporated herein by reference in its entirety.

BACKGROUND

1. Technical Field

Embodiments of the present invention relate to data visualization, and more specifically, to determining alternative visualizations for data based on a specification of a selected initial data visualization.

2. Discussion of the Related Art

Choosing an appropriate way to visualize data involves a combination of knowledge of the data and knowledge of data visualization techniques. However, business users that specialize in a particular domain typically lack expertise in data visualization techniques. Studies have shown a high degree of correlation between a user's chosen visual representation of data and its position in a list of available visualizations. In other words, people tend to simply choose the visualization that is most readily available which may not lead to an optimal visualization for the data.

BRIEF SUMMARY

According to one embodiment of the present invention, a computer-implemented method comprises generating an alternative visualization of a data set based on a specification of a selected first visualization of the data set and parameters comprising information pertaining to the data set. Embodiments of the present invention further include a system and computer program product for visualizing data in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

A visualization generally refers to a visual representation of data from a data set. Variables from the data set are typically mapped to a set of components of the visual representation. Examples of components include positions (e.g., X, Y, Z coordinates of a graph), aesthetics (e.g., color, size, labeling, shape, etc.) and faceting (e.g., rows, columns, outer rows, outer columns, etc. for a chart). An example data set, in a relational model, may comprise a data table in which each record (i.e., each row of data) is described by a set of columns, where each column is a data variable (also called a field).

Present invention embodiments provide a user with recommended alternative visualizations for data based on an initial visualization for the data selected by the user. An embodiment of the present invention analyzes a specification of the user's initial visualization, the data set, and metadata. This embodiment further supplies the user with a set of new candidate visualizations that describe additional aspects of the data, or provide a better visual representation of the data.

For example, if a user initially selects a scatterplot of variables X and Y, and there is a high degree of correlation between X and Y, an embodiment of the present invention may supply the user with a candidate visualization showing the results of statistical smoothing superimposed on the original scatterplot. Likewise, if the data contain additional categorical information, the candidate visualizations may include a scatterplot (with a legend) that identifies the category of each (X, Y) pair by color, shading, or marker shape. The set of candidate visualizations may include different types of visualizations than the original. For example, a user may initially select a bar chart for hierarchical data and receive a treemap that displays the hierarchical structure. Similarly, a user initially selecting a bar chart to represent a financial time series may receive a line graph; a user initially selecting a clustered bar chart might receive a dotplot or a paneled bar chart; and a user initially selecting a bar chart in which the data contain U.S. state names may be offered a map. Particular recommendations of alternative visualizations depend on context (e.g., the business domain, the data, and custom rules) and the user's initial visualization.

Figure 1:
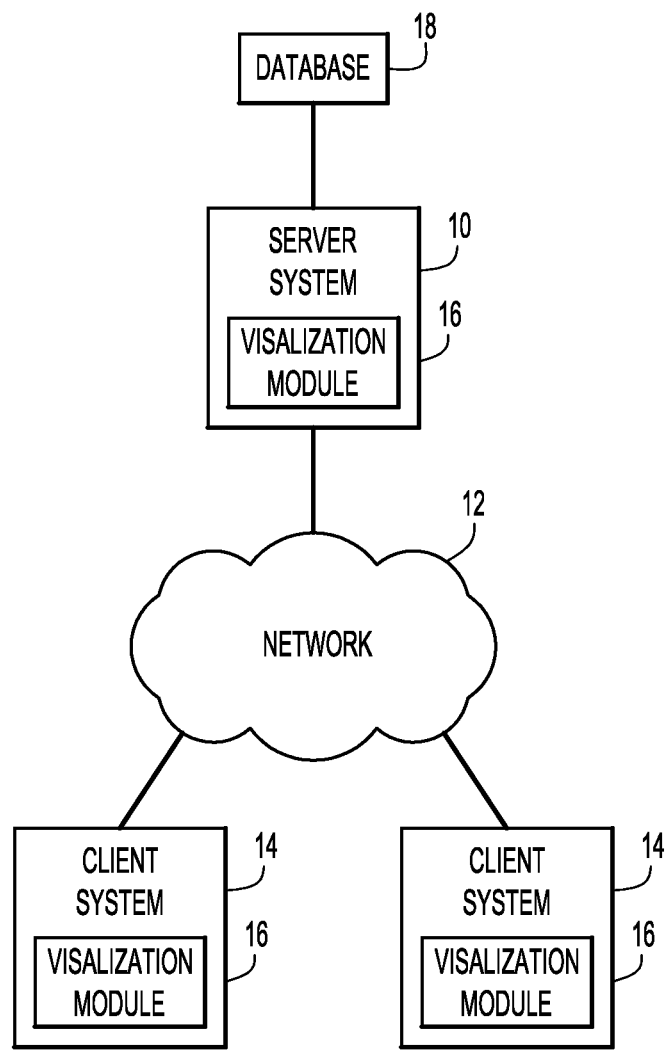
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to interact with server systems 10 for various applications. The server systems include a visualization module 16 to provide alternative visualizations of data based on an initial data visualization selected by a user. The visualization module receives initial visualization selections from users via client systems 14. The visualization module further receives the data set and other inputs (e.g. metadata and rule sets) that may be stored in a database system 18 or other sources. The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.).

The client systems 14 may present a graphical user (e.g., GUI, etc.) or other interface (e.g., command line prompts, menu screens, etc.) to solicit from users an initial selection of a visualization of desired data, and other information pertaining to the desired data and analysis, and may display the initial visualization and the set of alternative recommended visualizations and reports including other generated charts and any other types of analysis results.

Server systems 10 and client systems 14 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, visualization module, browser/interface software, etc.). In addition, visualization module 16 may include one or more modules or units to perform the various functions described below, and may be implemented by any combination of any quantity of software and/or hardware modules or units.

Alternatively, one or more client systems 14 may analyze data when operating as a stand-alone unit. In a stand-alone mode of operation, the client system stores or has access to the data, and includes a visualization module 16 to analyze the data and provide recommended alternative data visualizations based on an initial data visualization selected by a user.

Figure 2:
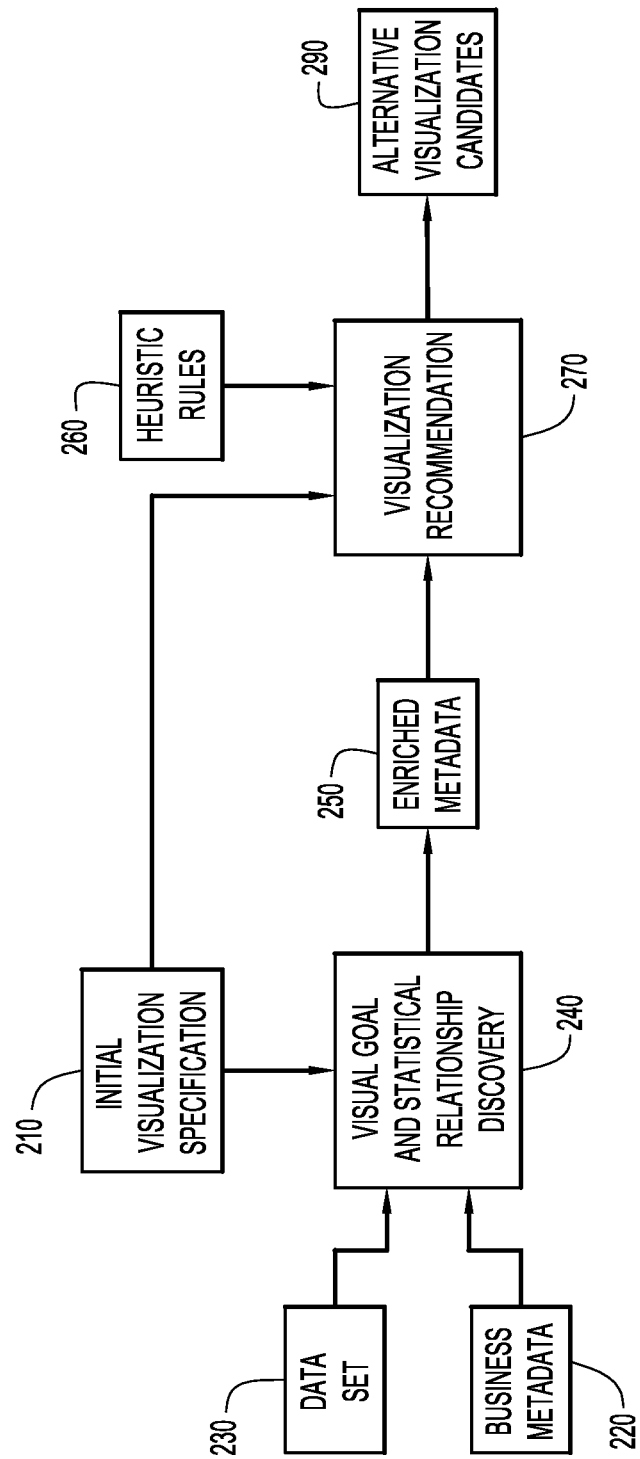
FIG. 2 is a flow diagram illustrating a manner in which a base visualization of data is analyzed to generate alternative visualizations of the data according to an embodiment of the present invention.

A manner of determining alternative visualizations for data (e.g., via visualization module 16 and server system 10 and/or client system 14) from an initial data visualization according to an embodiment of the present invention is illustrated in FIG. 2. In particular, visualization module 16 receives as input an initial visualization specification 210 (describing the user-selected visualization and identifying the source data set), data set 230, business metadata 220, and a set of heuristic rules 260 for determining alternative visualizations. The visualization module operates in stages including a visual goal and statistical relationship discovery stage 240 and visualization recommendation stage 270. Discovery stage 240 analyzes specification 210, data set 230, and business metadata 220 to discern information about the user's goal with respect to data visualization and find statistical relationships among variables in the data set. The results are passed to visualization recommendation stage 270 in the form of enriched metadata 250. Visualization recommendation stage 270 receives enriched metadata 250, specification 210, and heuristic rules 260 and applies the heuristic rules to generate alternative visualization candidates 290 for improved visualizations. The output of the visualization recommendation stage is a set of alternative visualization candidates 290. Each final visualization candidate is associated with an explanation stating a reason for the candidacy.

Figure 3:
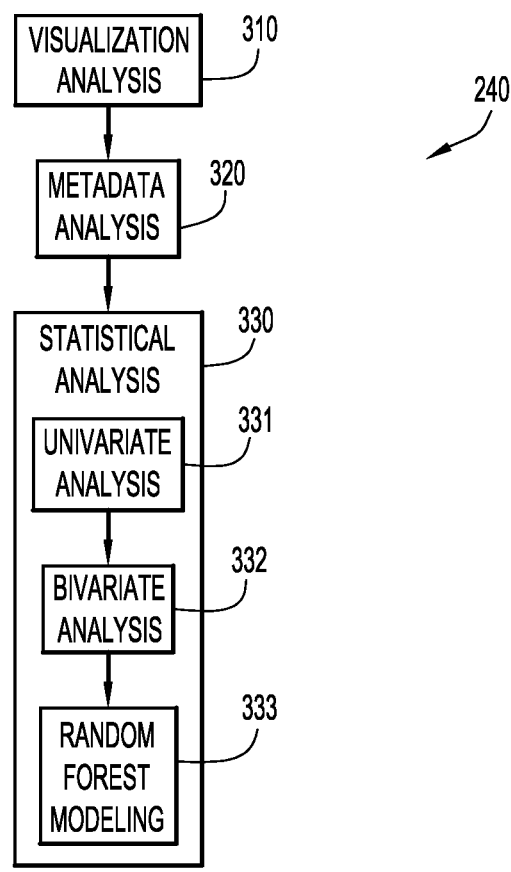
FIG. 3 is a flow diagram illustrating a manner of visual goal and statistical relationship discovery for the flow diagram of FIG. 2 according to an embodiment of the present invention.

A manner in which discovery stage 240 compiles information for visualization recommendation stage 270 (e.g., via visualization module 16 and server system 10 and/or client system 14) according to an embodiment of the present invention is illustrated in FIG. 3. In particular, visualization analysis 310 examines the semantic structure of initial visualization specification 210 to discover goals of the user with respect to data visualization and existing mappings of data to visualization components. The specification sufficiently describes the initial visualization, including information such as variable position, variable aesthetic representation (such as color, size, shape, or label), elements (such as bar, line, or point), faceting, and/or pre-calculated statistics. Such information reflects the user's intent. For example, a field chosen to be represented by position is likely a highly important field to the user, and usage of a bar element may indicate a preference for summaries as opposed to trends.

In addition, a visualization may be considered as a statistical model of the data. For example, the variable on the Y-axis of a chart is typically assumed to depend on the variable on the X-axis. The former may be labeled as a "target" variable and the latter as a "predictor" variable for use in multivariate modeling described below. Variables used to segment data, such as variables that are used to panel a chart or color points or lines of a chart, indicate a conditional relationship, where a Y variable depends on an X variable differently depending on the value of the conditioning variable.

Metadata analysis 320 collects business level metadata 220 and analyzes the metadata to discern context. Business metadata 220 may, for example, identify a variable as a monetary-type, and further classify the variable as an expense field or as a revenue field. Revenue fields and expense fields may be designated as targets and predictors respectively.

Statistical analysis 330 calculates statistics for individual variables and discovers statistical relationships among variables of the data set. Multi-variable statistical models may be produced along with association measures for pairs of variables. Initially, a univariate analysis 331 independently calculates statistical descriptive data for each variable. The univariate analysis includes standard statistical measures such as mean, standard deviation, count, missing value count, skewness, kurtosis, order statistics (median, quartiles, etc.) and a special indicator comprising a flag that is marked as true when the variable is determined to be an identifier. This is the case when a variable has unique values of strings or integers, with each data row including a unique value. These variables are not mapped to components of a visualization except for textual components.

In addition, a bounded-size summary of the data is created suitable for use in creating a statistical chart. For categorical data, this summary comprises a table of frequencies for the unique categories of a variable, while ensuring that at most a fixed number of categories (for example, a maximum of 100 categories) occurs by aggregating all the lowest frequency items into a single "other" category for the categories whose frequencies do not fall in the top fixed number (e.g., the top 100).

For numeric data, the same frequency table is generated, except that statistical binning is used to create frequencies for ranges of values. For example, variable-sized bins can be formed (utilizing a variable-bin histogram algorithm or any other suitable method) to generate a fixed number of bins for a variable (e.g., a maximum number of bins being 100).

The results of visualization analysis 310 (analyses of the specification), metadata analysis 320, and individual variable statistics 331 are used to select pairs of variables for bivariate statistical analysis 332, and to identify variables as targets and predictors for multivariate predictor models. The bivariate analysis determines the strength of relationships between pairs of variables. Variables with strong associations to other variables are given priority for multivariate predictor modeling 333. Multivariate predictor modeling determines relationships between more than two variables. The resultant multivariate predictor models include a set of variables with a known statistical relationship that can be used to generate candidate visualizations.

Bivariate analysis 332 produces a measure of the strength of the relationship and a measure of its statistical likelihood for each selected pair of variables. A bounded-size cross-tabulation table is generated that defines the frequencies of each selected set of paired values. This cross-tabulation table defines the joint distribution of the pair of variables. The table is analyzed to provide measures of the association including: a robust correlation measure to determine the statistical probability that the relationship is real; and the strength of the relationship, measured as the improvement in variance explained. The calculated measures are saved for later use. The cross-tabulation table can be used to create a bivariate visualization.

The strengths of the statistical relationships are evaluated using a technique that provides several advantages over traditional statistical methodology for calculating strengths of relationships between variables. It provides the advantage that it allows relationships between categorical and continuous variables to be compared easily, and the implementation advantage that once the cross-tabulations have been performed, the resulting analysis is not dependent on the scale of the data, and thereby has fixed computational time for a given number of variables. The details of the algorithm are described below.

For large number of variables, the resulting number of pairs can become overly large. Therefore, that analysis can be limited to the generation of a fixed number of bivariate visualizations, choosing those with the highest strengths of relationships which are statistically significant and those identified as of interest to the user based on the results of visualization analysis 310 (analyses of the specification), metadata analysis 320, and individual variable statistics 331.

The generation of a cross-tabulation table is described in greater detail as follows. As previously described, each variable of the data set can have a bounded-size frequency representation calculated, whether numeric or categorical. This results in defining at most a given number of bins (numeric or categorical) for each variable. Therefore, a pair of variables will define a table with a bounded number of cells (for example, given a limit of 100 categories per variable, this results in at most 10,000 cells for a pair of variables). The algorithm iterates through the data, and, for each pair, calculates the cell defined by the intersection of the bin for a first variable (variable 1) and the bin for a second variable (variable 2). The frequency for that cell is then incremented. For data with fewer than the number of bounded categories (e.g., 100 categories), the cross-tabulation table will be a perfect representation of the true bivariate distribution.

For efficiency, the cross-tabulation can be generated such that zero values are not stored, with only non-zero combinations being recorded.

The cross-tabulation between variable pairs becomes an approximation when the data are diverse. The choice of a binning algorithm for numeric data will strongly affect the utility of this technique. In an example implementation, variable-width bins are used so that the marginal bin frequencies are more uniform and therefore more useful for analysis than fixed-width bins will be, in the case of highly non-uniform data.

The variable metadata (from visualization analysis 310 and/or metadata analysis 320) can be used to indicate which variable is used for the Y dimension and which is used for the X dimension, with target variables on the Y dimension and predictors on the X dimension, by preference.

To compute the robust correlation measure, the cross-tabulation table is analyzed using standard analysis of variance (ANOVA) techniques for a two way table. The chi-squared measure is used to calculate the statistical probability that the relationship is real. The strength of the relationship is evaluated as the proportion of variance explained (the square root of the fraction SSE/SSTO in standard ANOVA terms).

The robust correlation measures of the data are calculated using the standard statistical chi-squared test for independence. It produces measures including: the statistical significance and a prediction of the variation in the counts (measured by dividing SSE, the sum of squared error terms when using the marginal frequencies to predict the counts, by SSTO, the sum of squared error terms when assuming all cells have equal frequencies).

Multivariate analysis 333 looks for statistical relations among two or more variables. In an embodiment, the standard statistical technique of "random forests" is used to model the dependence of target variables on sets of predictor variables. This technique remains useful even if the number of variables is too large to consider all possible combinations. The techniques involved with this approach are as follows:

1. For each target variable Y, build a random forest model that predicts this variable using a subset of the other variables.
   a. Use the variable metadata to ensure that only variables with usage "unknown" or "predictor" are used to predict a variable.
   b. If there are a large number of such variables (enough to make fitting the model overly long), choose those variables with the greatest strengths of relationships with the target variable, using the association data calculated during the bivariate associations, and those identified as of interest to the user based on the analysis of the initial visualization and metadata.
2. For each model, record (i) the statistical probability that the relationship is real; and (ii) the strength of the relationship, measured as the improvement in variance explained.
3. If the model is statistically valid, record the contribution of each variable X to the model for the target variable Y. This can be done in a number of ways, such as those described for standard or typical random forest models. In an example implementation, the model is re-fit with the variable X excluded from the model, and the difference in strength of relationship is used as the contribution measure. The result is, for each variable, a list of other variables that are associated with this variable in a multivariate sense, ordered and scored by their contribution to the multivariate model.

The results of discovery stage 240 are compiled as enriched metadata 250, which includes the business metadata and any metadata from within data set 230, enriched with statistical information (for example, the strongest associations with other fields) and measures of how important fields are to the user (for example, a field used initially on the y-axis is considered highly important to the user). The enriched metadata 250 is provided to visualization recommendation stage 270.

Figure 4:
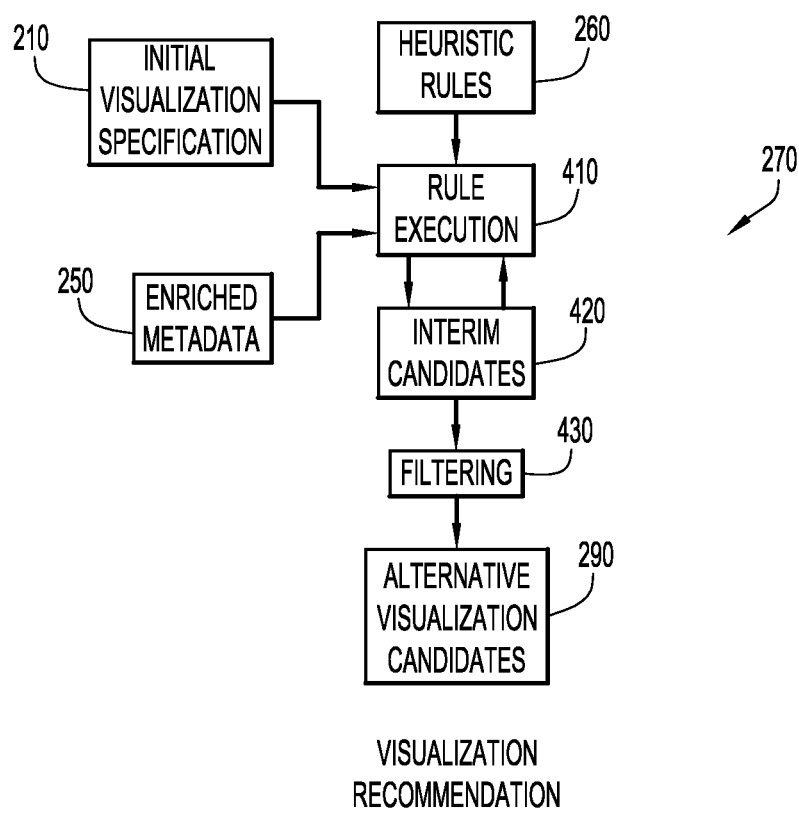
FIG. 4 is a flow diagram illustrating a manner of visualization recommendation for the flow diagram of FIG. 2 according to an embodiment of the present invention.

A manner in which visualization recommendation stage 270 generates new candidate visualizations (e.g., via visualization module 16 and server system 10 and/or client system 14) according to an embodiment of the present invention is illustrated in FIG. 4. In particular, rule execution 410 receives heuristic rules 260, initial visualization specification 210, and enriched metadata 250 and produces interim candidates 420. Each interim candidate comes with a plain-text explanation and one or more scores by which candidates can be ordered. Interim candidates 420 are not actual renderings of visualizations, but instead are specifications of visualizations to which the heuristic rules can be applied. During processing, these specifications are placed in a pool providing further input to rule execution 410. The rules are executed in an expert system fashion, such as forward chaining or other type of expert system. For example, the rules may be executed against each new interim candidate to generate further interim candidates until all unique candidates have been found or a limit is reached. Filtering 430 selects (e.g., using the scores) a final set of alternative visualization candidates 290 from the interim candidates 420.

Figure 5:
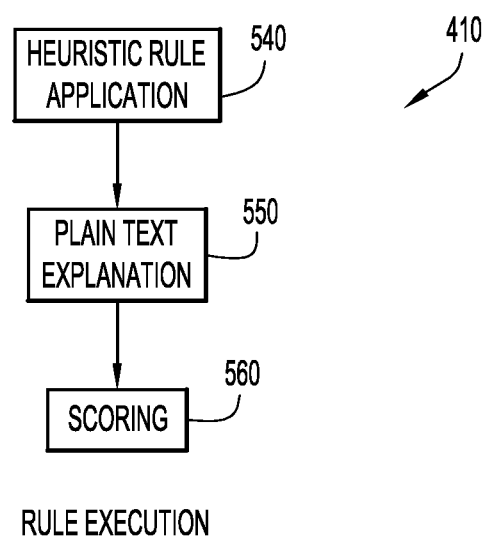
FIG. 5 is a flow diagram illustrating a manner of rule execution for the flow diagram of FIG. 4 according to an embodiment of the present invention.

A manner in which rules execution 410 and filtering 430 generate interim and final candidates according to an embodiment of the present invention is illustrated in FIG. 5. In particular, heuristic rule application 540 creates a new candidate visualization by applying a heuristic rule 260. For example, if the goal is determined to be "show trends for revenues" and there is a strong association between revenue and the identifier for a store, then a line or area element would be added to the original specification, if not already present, and a smoothing function may be applied to the line to make the trends clearer. Rules 260 are designed to evaluate enriched metadata 250 and/or initial visualization specification 210 and make improvements to the visualization or create a new visualization with an improvement. The rules may include predefined rules, generic rules, rules defined by a domain expert (e.g. finance rules), rules defined for a specific data set, and/or rules defined by users for particular analyses. The rules for the system may be tuned for different purposes, such as creation of improved visualizations based on common mistakes made by novices or to gravitate towards representations more relevant within a certain industry domain. Each rule typically modifies only a component aspect of a visualization, such as the application of color to represent a field or the choice of using points to represent the data versus using bars.

Plain text explanation 550 provides a plain text justification for each rule that produces a new candidate. These explanations are generated and captured as the rules are applied. At the end of the process, these sentences are assembled into a paragraph and presented to the user. For example, a sentence that explains how a smoothed representation makes it simpler to see overall trends may be added when a rule determines to add a statistical smoother to the graphic.

Scoring 560 assigns scores to interim visualization candidates 420. Any suitable scoring system may used. A scoring system may use industry specific rules. Several different scores that represent various desirable traits may be created and assigned. Examples include scores representing strength of association, complexity/simplicity, and paneling or number of represented dimensions of data. A weighted combination of such factors can be used to generate an overall score, which is then used to select the most informative candidate visualizations from the possible ones.

Strength of association may be scored based on the strengths of the statistical relationship exhibited by each component of a visualization, and on the suitability of each visualization component for a given type of statistical relationship. Per-component measures of data suitability, which are based on statistical along with meta characteristics of the data (such as number of categories, skewness and uniformity), provide a measure of how suitable a given component is for a variable. For example, a categorical variable with five cases is more suited to be used for color than a skewed numeric variable. Specifically, candidate visualizations can be ranked according to their conformance with the preferred usage order for predictor variables given, by way of example, in Table 1 below.

TABLE 1

Preferential Usage Order for Predictor Variables

| Importance | Number of Categories | Measurement Level | Aesthetic Usage Order |
|---|---|---|---|
| High | High | Numeric | X, Color, Size |
| High | High | Set | X, Color |
| High | Low | Numeric | X, Size, Facet-Y |
| High | Low | Set | X, Facet-X, Facet-Y |
| Low | High | Numeric | Color, Size |
| Low | High | Set | Color, X |
| Low | Low | Numeric | Facet-X, Color |
| Low | Low | Set | Facet-Y, Color |

Multivariate candidate visualizations may be scored based on how easy it is for a user to interpret them given the complexity of components and combinations of components. For example, an X position component is easier to interpret than a color component. In addition, whereas one faceting component is relatively interpretable, two are much harder to interpret. In an example embodiment, complexity is measured using a linear statistical model derived from a controlled experiment, where the predictors of complexity in the model are counts of numbers of graphical elements present. However, any modeling technique can be used so long as it allows any multivariate visualization description to be scored. For example, the model can be pre-built based on experience, a user study, or other technique.

An example algorithm for use in filtering 430 (FIG. 4) to select multivariable visualization candidates that takes into account the complexity model but does not simply pick the best or least complex visualizations performs the following iteratively:

1. Pick the highest scored model from the list of potential candidates.
2. For each other model, reduce the score for that model based on how similar it is to the model chosen. In the preferred implementation this is accomplished as follows:
   a. The similarity, S, is calculated as the number of common variables divided by the average of the number of variables in the two candidates, a value between 0 and 1.
   b. The score for the other model is reduced by a fixed multiple of S (0.25)
3. Repeat the process until all remaining models have scores below zero.

The algorithm described above ensures that a representative set of candidate models are chosen. This ensures that the best candidates are selected, subject to a "diminishing returns" policy that reduces the usefulness of candidates that are similar to ones already selected.

Each candidate visualization specification describes the mappings from variables to visualization components. This is used directly to construct a visualization using a suitable visualization system. The element choices and positional variables can be used to define the basic visualization type, where color, size and shape variables are used to modify that visualization. Finally, the variables assigned to a facet are used to panel the visualization.

User interface controls are employed to order or filter the list of candidate visualizations based on the values of these scores. For example, the user may be presented with a top ten list or other listing of a suitable number of generated charts having the highest or best rankings. The user can then choose one or more charts from the presentation. The user can further limit the search space for the generation of charts and/or the presentation of generated charts in any suitable manner (e.g., by requiring that a particular variable be located on the X-axis of a two dimensional chart), where the generated charts are ranked and presented to the user based upon the limitation implemented by the user.

The result of the process is a variety of alternative visual representations based on the graphic originally supplied. Each candidate comes with a few sentences that provide an explanation for the graphic and why certain aspects are relevant.

Figure 6:
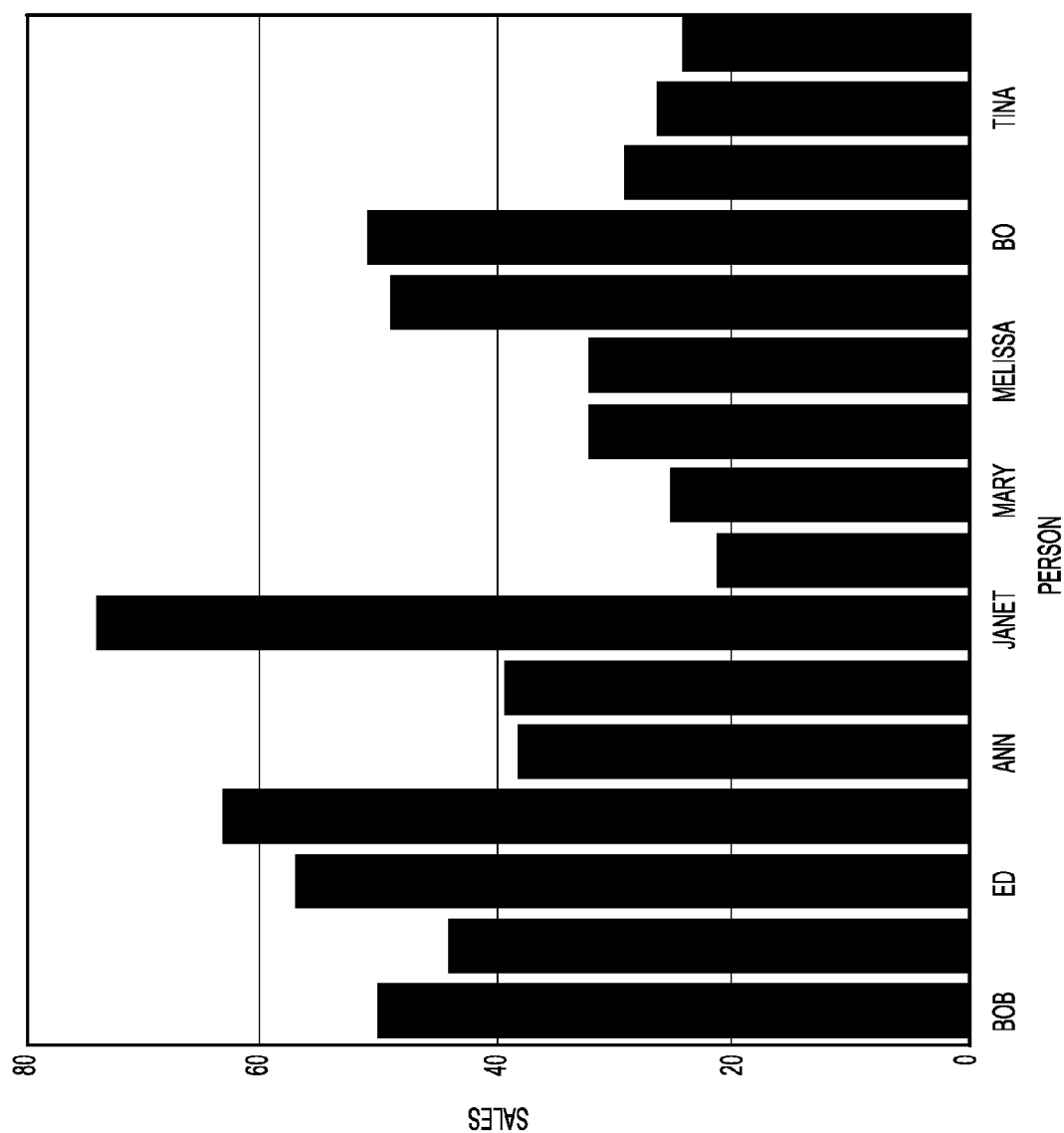
FIG. 6 is an illustration of an example initial data visualization.

An example demonstrates aspects of visualization recommendation according to an embodiment of the present invention. In this example, the user initially creates a simple bar chart of sales against salesperson as illustrated in FIG. 6. An example data set for this chart is shown in Table 2 below.

TABLE 2

Data Table:

[50.0, 30.0, 0],
[44.0, 25.0, 1],
[57.0, 35.0, 2],
[63.0, 40.0, 3],
[38.0, 35.0, 4],
[39.0, 22.0, 5],
[74.0, 46.0, 6],
[21.0, 23.0, 7],
[25.0, 8.0, 8],
[32.0, 34.0, 9],
[32.0, 16.0, 10],
[49.0, 22.0, 11],
[51.0, 41.0, 12],
[29.0, 34.0, 13],
[26.0, 19.0, 14],
[24.0, 12.0, 15]

The first column of the table contains sales figures, the second column contains volume figures and the last column is the index of the salesperson (corresponding to a list of names "Bob", "Nancy", "Ed", "Pat", "Ann", "Bill", "Janet", "Brad", "Mary", "Roger", "Melissa", "Jack", "Bo", "Kate", "Tina", "Jonah").

Heuristic rules 260 for this example are defined in Table 3 as follows, with a weight for how important each rule is when triggered.

TABLE 3

Heuristic Rules

| Label | Heuristic Rule | Weight |
|---|---|---|
| [A] | Bars are better sorted by their value. | 1.0 |
| [B] | Show categorical data by color if not on an axis. | 0.8 |

TABLE 3-continued

Heuristic Rules

| Label | Heuristic Rule | Weight |
|---|---|---|
| [C] | Use strongly statistical correlated fields as the two positional variables. | 2.0 |
| [D] | If a field uses state IDs, draw a map using it. | 5.0 |
| [E] | Points show relationships between numeric data best. | 2.0 |
| [F] | Show numeric data as size, if not on an axis. | 0.7 |

Discovery stage 240 identifies volume and sales as numeric variables and salesperson index as a categorical variable. A strong statistical correlation is found between sales and volume.

Applying the heuristic rules to the initial visualization triggers the rules labeled [A], [B], [C], and [F]. Rule [D] does not trigger because no state IDs were found, and [E] does not trigger because there is no relationship between numeric data being displayed.

By way of example, only the top two results are used. According to the weights in Table 3, these are the results of rules [A] and [C]. As a result, two interim visualization candidates are created:

[N1] Base+[A]: Sorted bar chart,

[N2] Base+[C]: Volume plotted on the X axis (with bars at irregular intervals), where [N1] and [N2] label the new visualizations and Base+[rule label] indicates the base visualization modified according to the heuristic rule corresponding to the rule label.

The heuristics are re-run on each of these. For [N1], rule [C]triggers but is discarded because it would produce the same chart as [N2]. Rule [F] also triggers, generating a new candidate:

[N3] Base+[A]+[F]: Sorted bar chart with volume mapping to bar width ("size").

Applying the heuristics to [N2], rule [B] fires and rule [E] fires, resulting in two new candidates:

[N4]: Base+[C]+[B]: Colored bar chart where the x-axis is volume,

[N5]: Base+[C]+[E]: Replacing the bars by points to make a scatterplot.

Applying the heuristics rules to [N3], [N4], and [N5], produces only one new possibility:

[N6]: Base+[C]+[B]+[E]: Colored scatterplot.

Figure 7A:
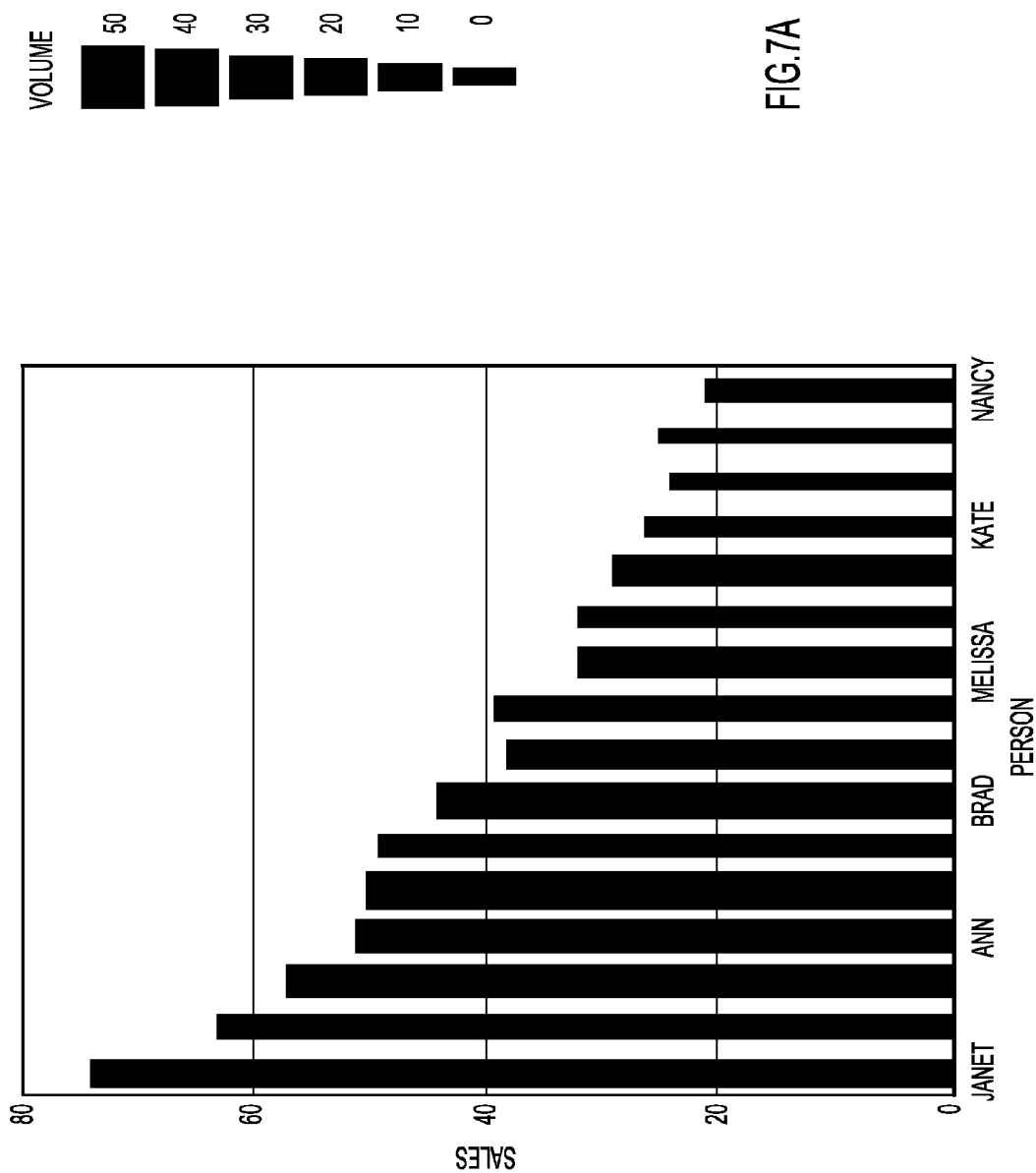
FIGS. 7A-7B illustrate example alternative visualizations recommended for the initial data visualization of FIG. 6 according to an embodiment of the present invention.
Figure 7B:
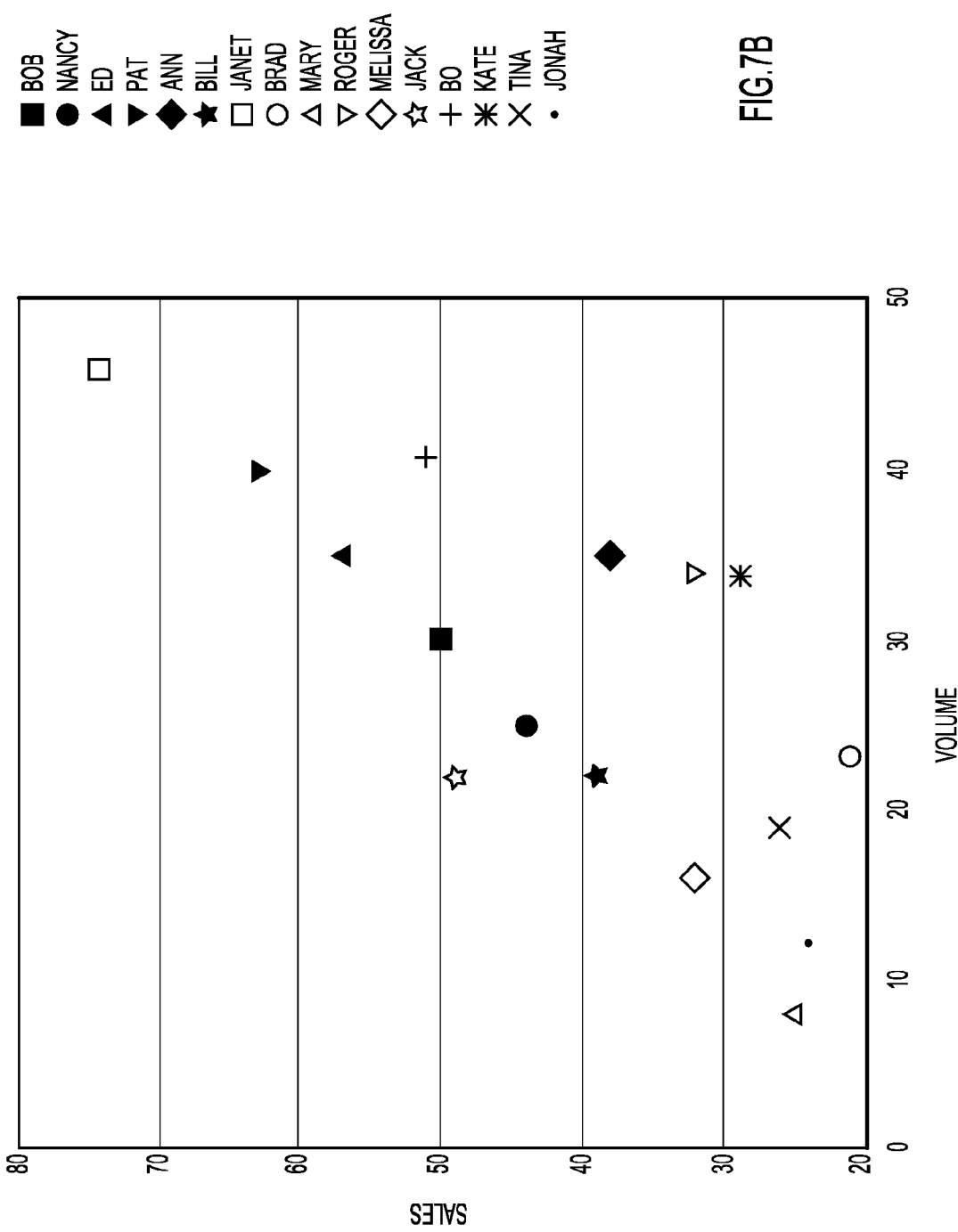

In this example, the six candidates are scored by calculating their weights. Again, only the top two are used, yielding final visualization candidates [N3] and [N6], illustrated in FIGS. 7A and 7B respectively (with symbols substituted for colors in FIG. 7B). Candidate [N3] is a sorted bar chart of volume by salesperson with bar width showing volume. Rules [A] and [F] automatically generate the plain text justification: "Ordering Person by the value of Sales makes it easier to see the largest and smallest values of Sales. Volume has been encoded as size because Volume is numeric." Candidate [N6] is a scatterplot of sales by volume, colored by salesperson. The text justification is automatically generated by the rules [C], [B], [E]: "Putting Volume on the X-axis shows the strong association between Volume and Sales. Points were chosen because both axes show numeric data. Salesperson has been encoded as color because Salesperson is categorical." These final visualization candidates are presented to the user together with the original chart.

Thus, the present invention embodiments automatically generate a plurality of alternative visualizations for an initial visualization of data from a multivariate data set and provide a user with a subset (based upon a ranking or scoring of the initial set of visualizations) to consider, which results in providing improved visualizations of the data while minimizing the time and effort that would otherwise be required by the user to try to determine the best manner to display the data.

It will be appreciated that the embodiments described above and illustrated in the drawings represent only a few of the many ways of implementing embodiments providing a user with a set of recommended visualizations of a data set based on an initial visualization.

A recommendation module may operate as a standalone application or as an add-on to or component of applications for visualization, reporting, analysis, etc. The specification of the user's initial visualization may be a product of a visualization application, or it may be created by translating the user's commands to a visualization application or by translating a data structure or other specification of a visualization created by a visualization application.

The user's initial visualization may have any form (e.g., bar chart, scatterplot, etc.). An alternative or recommended visualization may have any form (e.g., bar chart, scatterplot, etc.), and may have the same form as the user's initial visualization or a different form.

A visualization specification may have any format suitable to describe a visualization for rule application. The format may permit visualization components to be treated as addable or replaceable parts. Metadata (including enriched metadata) may be incorporated into the visualization specification. The visualization specification may take the form of metadata.

Enriched metadata may include any type of metadata, such as information about usage of a variable (e.g., target or predictor), statistical information (e.g., single variable statistics, statistical relations including multi-variable models, tables, histograms, etc.), domain information (e.g., "time series", "banking", "e-commerce", etc.), storage type (e.g. integer, floating point, string, date, etc.), measure type (e.g., ratio, ordinal, binary, etc.). Enriched metadata may be collected from any source, such as preexisting metadata, information provided by a user, and information determined by visual goal and statistical relationship discovery (e.g., by comparing variable names to regular expressions). Metadata may be represented by any type of values (e.g., boolean, alphanumeric, numeric, character, symbol, etc.).

Statistical analysis may encompass any data in addition to data exhibited in the user's initial visualization, for example additional columns of tables containing the user's variables and columns in related tables. Any statistical measures (e.g., standard correlations) and methods including pre-computed statistics (e.g., from metadata) may be used. Statistics may be computed with or without any type of binning (e.g., variable or constant bin sizes, un-binned data, truncated ranges, etc.). Any type of data models may be produced (e.g., random forest models, neural networks, parameterized models, etc.). Models may be chosen based on visualization analysis and/or metadata analysis (e.g., variables identified as important may be modeled in greater combinations, or by additional or more detailed models). Statistical analyses (e.g., for individual variables, pairs of variables, multivariate models, etc.) may utilize parallel processing or a distributed analytic framework (built on cloud-computing, HADOOP, or similar environments). However, the processing can also be implemented by running the analyses within a single processing thread or any other processing system.

Visualization recommendation may follow any procedure to generate alternative visualization candidates. Each rule may generate one or more visualization candidates. Rule execution may occur in any fashion, such as single pass, iterative, expert system, etc. Explanations for alternative visualizations may take any format and include any type of text, symbols, and graphics. Explanations may be generated at any time (e.g., concurrently with new candidates, after selection of final candidates, etc.). Any type of scores and scoring system may be used. Scores may take into account any user input and metadata.

Final alternative visualization candidates may be rendered at any time (e.g., during visualization recommendation, before or after presentation to the user, etc.) and may be rendered by the visualization module or other module or application.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., browser software, communications software, server software, visualization module, etc.). These systems may include any types of monitors and input devices (e.g., keyboard, mouse, voice recognition, etc.) to enter and/or view information.

It is to be understood that the software (e.g., visualization module of the client systems and server system) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments (e.g., visualization module of the client systems and database system) may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., statistical or other data, models, visualization specifications, visualizations, rules, etc.). The database system may be implemented by any number of any conventional or other databases, data stores or storage structures (e.g., files, databases, data structures, data or other repositories, etc.) to store information (e.g., statistical or other data, models, visualization specifications, visualizations, rules, etc.). These systems may be included within or coupled to the server and/or client systems. The database systems and/or storage structures may be remote from or local to the computer or other processing systems, and may store any desired data (e.g., rules, models, statistical or other data, visualization specifications, visualizations, etc.).

Present invention embodiments may be utilized for recommending alternative visualizations of data of any types (e.g., boolean, character, alphanumeric, symbols, etc.) representing any information. Further, present invention embodiments may be utilized for recommending alternative visualizations of data from any types of storage units, systems or devices (e.g., databases, files, memory devices, data structures, processing devices, various types of stationary or mobile computer or processing systems or devices, etc.). The data set may comprise one or more data sets and may be of any size, and include any type of data and metadata.

The present invention embodiments may employ any number of any type of user interface (e.g., Graphical User Interface (GUI), command-line, prompt, etc.) for obtaining or providing information (e.g., obtaining information for the desired analysis to be performed, providing charts or other data visualizations, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for analyzing and generating visualizations of data from any data source for any type of process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A computer-implemented method comprising:
analyzing a specification of a selected first visualization of a data set to determine information about a data visualization goal, wherein the specification describes the selected first visualization;
performing statistical analysis of the data set to determine statistical relations and strengths of the statistical relations between two or more variables in the data set, wherein performing the statistical analysis comprises:
identifying variables associated with dimensions of the selected first visualization based on statistics of individual variables in the data set;
building a multivariate model to predict dependence of a first variable on other variables of the data set based on the identified association of the first variable with a visualization dimension; and
determining a relation of the first variable and a second variable based on the multivariate model; and
generating an alternative visualization of the data set based on the specification of the selected first visualization of the data set and parameters comprising the determined information about the data visualization goal and the determined statistical relations and strengths, wherein the strengths indicate a mapping between the variables and visualization dimensions.

2. The method of claim 1, wherein the parameters further comprise metadata for the data set and statistical relations among more than two of the variables in the data set.

3. The method of claim 1, wherein
the selected first visualization comprises a chart;
analyzing the specification comprises determining an association of the first variable with a predetermined axis of the chart; and
generating the alternative visualization comprises generating a representation of the relation of the first variable and the second variable based on the determination of the relation.

4. The method of claim 1, further comprising generating an explanation for the alternative visualization.

5. The method of claim 1, wherein
the specification of the first visualization comprises a set of visualization components, and
a specification of an alternative visualization is generated by applying a pre-defined heuristic rule to create a modified instance of the set of visualization components.

6. The method of claim 1, further comprising:
generating specifications of a plurality of new visualizations by applying heuristic rules to the specification of the first visualization and re-applying the heuristic rules to the generated specifications of the plurality of new visualizations to produce specifications for one or more additional new visualizations.

7. The method of claim 1, wherein the selected first visualization comprises a chart and determining the information about a data visualization goal comprises:
   determining an interest in a dependence of the first variable of the data set on the second variable of the data set based on an association of the first and second variables with respective axes of the chart.

8. The method of claim 7, wherein the dependence of the first variable on the second variable is conditioned on a third variable of the data set.

9. The method of claim 1, wherein performing the statistical analysis comprises:
   calculating univariate statistics for individual variables of the data set;
   calculating bivariate statistics for pairs of the individual variables, wherein the pairs are selected based on the analysis of the specification of the selected first visualization; and
   determining multivariate statistical relationships between more than two of the variables.

10. The method of claim 1, wherein the specification of the selected first visualization comprises metadata specifying variable position, variable aesthetic representation, graphical elements, faceting, and pre-calculated statistics.

* * * * *